United States Patent
Riccio et al.

(10) Patent No.: US 11,046,804 B2
(45) Date of Patent: Jun. 29, 2021

(54) POLYOL COMPOSITIONS

(71) Applicant: Dow Global Technologies LLC, Midland, MI (US)

(72) Inventors: Rossella Riccio, Correggio (IT); Irena Amici-Kroutilova, Horgen (CH); Giuseppe Vairo, Correggio (IT); Paul Cookson, Horgen (CH); Francois M. Casati, Horgen (CH); Elena Ferrari, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 34 days.

(21) Appl. No.: 16/337,549

(22) PCT Filed: Sep. 28, 2017

(86) PCT No.: PCT/US2017/053897
§ 371 (c)(1),
(2) Date: Mar. 28, 2019

(87) PCT Pub. No.: WO2018/064266
PCT Pub. Date: Apr. 5, 2018

(65) Prior Publication Data
US 2020/0031981 A1 Jan. 30, 2020

(30) Foreign Application Priority Data

Sep. 30, 2016 (IT) .................. 102016000098460

(51) Int. Cl.
| | |
|---|---|
| C08G 18/08 | (2006.01) |
| C08G 18/42 | (2006.01) |
| C08G 18/76 | (2006.01) |
| C08K 5/00 | (2006.01) |
| C08K 5/21 | (2006.01) |
| C08K 7/02 | (2006.01) |

(52) U.S. Cl.
CPC ..... *C08G 18/0876* (2013.01); *C08G 18/4219* (2013.01); *C08G 18/7621* (2013.01); *C08G 18/7664* (2013.01); *C08G 2110/0025* (2021.01); *C08K 5/0066* (2013.01); *C08K 5/21* (2013.01); *C08K 7/02* (2013.01); *C08K 2201/003* (2013.01)

(58) Field of Classification Search
None
See application file for complete search history.

(56) References Cited

U.S. PATENT DOCUMENTS

| | | |
|---|---|---|
| 9,840,603 B2 | 12/2017 | Cookson et al. |
| 2006/0058410 A1 | 3/2006 | Yu et al. |
| 2010/0069518 A1* | 3/2010 | Mispreuve ......... C08G 18/3281 521/126 |
| 2010/0160470 A1 | 6/2010 | Smiecinski et al. |
| 2014/0329925 A1 | 11/2014 | Cookson et al. |
| 2015/0038653 A1* | 2/2015 | Borella ................ C08G 18/242 525/459 |
| 2016/0280841 A1 | 9/2016 | Casati et al. |

FOREIGN PATENT DOCUMENTS

| | | |
|---|---|---|
| SU | 615865 | 7/1978 |
| WO | 03/016373 | 2/2003 |

OTHER PUBLICATIONS

International Search Report & Written Opinion for related PCT Application PCT/US2017/053897, dated Jan. 4, 2018 (9 pgs).
Zhang, et al., "Properties of Rigid Polyurethane Foams Prepared with Synthesized PIPA Polyol"; American Journal of Chemistry and Application, Published Mar. 20, 2014 (8pgs).
International Preliminary Report on Patentability for related PCT Application PCT/US2017/053897, dated Apr. 11, 2019 (7 pgs).
Sutagin, et al., "Chemistry and Physics of Polymers"; Ministry of Education of the Russian Federation, Tomsk Polytechnic University, 2003, (Original & Translation Copy Attached; 4 pgs Total).

* cited by examiner

*Primary Examiner* — Robert T Butcher
(74) *Attorney, Agent, or Firm* — Brooks, Cameron & Huebsch, PLLC

(57) ABSTRACT

Embodiments of the present disclosure are directed towards polyol compositions including a dispersion of polyisocyanate polyaddition particles in a carrier polyol, wherein the polyisocyanate polyaddition particles have an average particle diameter from 0.1 to 10.0 microns and the dispersion has a solids content from 5 wt % to 50 wt % based upon a total weight of the dispersion, and a polyester polyol that is from 1 wt % to 98 wt % of the polyol composition based upon a total weight of the polyol composition.

12 Claims, No Drawings

POLYOL COMPOSITIONS

This application is a National Stage Application under 35 U.S.C. § 371 of International Application Number PCT/US2017/053897, filed Sep. 28, 2017 and published as WO 2018/064266 on Apr. 5, 2018, which claims the benefit Italian Non-Provisional Application 102016000098460, filed Sep. 30, 2016, the entire contents of which are incorporated herein by reference in its entirety.

FIELD OF DISCLOSURE

Embodiments of the present disclosure are directed towards polyol compositions, more specifically, embodiments are directed towards polyol compositions that can be utilized to form rigid closed-cell foams.

BACKGROUND

Foams are dispersions in which a gas is dispersed in a liquid material, a solid material, or a gel material. Foams can be formed by a chemical reaction of polyols and isocyanate. Foams can be utilized for a number of various applications, including bedding, furniture, vehicle seating, thermal insulation, and carpet backing, among others.

SUMMARY

The present disclosure provides polyol compositions including a dispersion of polyisocyanate polyaddition particles in a carrier polyol, wherein the polyisocyanate polyaddition particles have an average particle diameter from 0.1 to 10.0 microns and the dispersion has a solids content from 5 wt % to 50 wt % based upon a total weight of the dispersion, and a polyester polyol that is from 1 wt % to 98 wt % of the polyol composition based upon a total weight of the polyol composition.

The present disclosure provides rigid closed-cell foam formulations including the polyol compositions; a blowing agent; and a polyisocyanate.

The present disclosure provides rigid closed-cell foams formed from the rigid foam formulation.

The present disclosure provides methods for forming a rigid closed-cell foams including curing the rigid closed-cell foam formulations.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polyol compositions, rigid closed-cell foam formulations including the polyol compositions, and rigid closed-cell foams formed therefrom are disclosed herein. Polyols, e.g., the polyol compositions disclosed herein, can be combined with isocyanates to form rigid closed-cell foam formulations. The rigid closed-cell foam formulations can be cured to form rigid closed-cell foams, which may be referred to as polyurethanes or polyisocyanurates.

Polyurethanes are polymers including chains of units joined by carbamate links, which may be referred to as urethane links. PIR (polyisocyanurates) have high level of trimerized isocyanate.

As mentioned the rigid closed-cell foam formulations disclosed herein may be utilized to form rigid closed-cell foams. These rigid closed-cell foams can have properties that are desirable for various applications. For instance, the rigid closed-cell foams disclosed herein can have an improved, i.e., reduced, average cell diameter as compared to other rigid closed-cell foams. This reduced average cell diameter is surprising, as the rigid closed-cell foams disclosed herein utilize a dispersion of polyisocyanate polyaddition (PIPA) particles in a carrier polyol having a solid content from 5 wt % to 50 wt %. It has been observed, e.g., as discussed in WO 99/60045, that styrene and/or styrene acrylonitrile based polymer polyols, which include solid particles, produce a high level of open cells. The high level of open cells is apparently, in some part, due to the solid content, which functions as cell disruptors, of the styrene and/or styrene acrylonitrile based polymer polyols.

Additionally, the rigid closed-cell foams disclosed herein can have an improved, i.e., reduced, thermal conductivity as compared to other rigid closed-cell foams. While not to be bound to theory, it is believed that the reduced average cell diameter of the rigid closed-cell foams can help to provide the reduced thermal conductivity as compared to other rigid closed-cell foams.

Further, the rigid closed-cell foam formulations disclosed herein can have a number of curing properties that are desirable for various applications. For instance, the rigid closed-cell foam formulations disclosed herein can have cream times, gel times, and/or tack free times that are comparable, as compared to curing properties of other foam formulations.

Polyol compositions are disclosed herein. As used herein, "polyol" refers to an organic molecule, e.g., polyester, having an average of greater than 1.0 hydroxyl groups per molecule.

The polyol compositions disclosed herein include a dispersion of PIPA particles in a carrier polyol and a polyester polyol that is from 1 wt % to 98 wt % of the polyol composition based upon a total weight of the polyol composition. The dispersion includes the carrier polyol and solid particles, i.e. the PIPA particles, dispersed therein.

The dispersion of PIPA particles in the carrier polyol may be formed by a number of processes; such processes are discussed in WO2015/038825 and WO2015/038826, each of which is incorporated herein by reference. As an example, the dispersion of PIPA particles in the carrier polyol can be formed as a reaction product of a low equivalent weight isocyanate-reactive hydrogen containing compound having a number average isocyanate-reactive hydrogen containing compound equivalent weight of less than 80 with a polyisocyanate having a number isocyanate equivalent weight that is less than 225, dispersed in a carrier polyol having a number average hydroxyl equivalent weight from 200 to 2000 with at least 50% of secondary hydroxyl groups based on a total amount of hydroxyl groups in the carrier polyol. The reaction may be performed in situ, e.g., while the low equivalent weight isocyanate-reactive hydrogen containing compound and the polyisocyanate reactants are dispersed or dissolved in the carrier polyol, of which hydroxyl groups in both the low equivalent weight isocyanate-reactive hydrogen containing compound and the carrier polyol are reactive with isocyanate groups in the polyisocyanate. The reaction between the carrier polyol and the polyisocyanate may result in grafting. The grafting may help stabilize the dispersion of PIPA particles in the carrier polyol. However, an excessive amount or grafting may result in a highly viscous product that contains little or no dispersed polymer phase. Accordingly, when forming the dispersion of PIPA particles in the carrier polyol, the reaction, e.g., which forms the polyurethane or polyurethane-urea bonds may be balanced with the grafting reaction. This balance may be achieved by selecting a low equivalent weight isocyanate-reactive hydrogen containing compound that is more reactive toward isocyanate groups than the carrier polyol while still providing a sufficient amount of grafting to form a stable dispersion, and optionally through catalyst selection and catalyst concentration in the reactants and/or a stabilizer for the dispersion, for example.

The dispersion of PIPA particles in the carrier polyol may have a solids content from 5 wt % to 50 wt % based upon a total weight of the dispersion. All individual values and subranges from 5 wt % to 50 wt % are included; for example, the dispersion of PIPA particles in the carrier polyol may have a solids content from a lower limit of 5 wt %, 10 wt %, or 15 wt % to an upper limit of 50 wt %, 45 wt %, or 40 wt % based on a total weight of the dispersion of PIPA particles in the carrier polyol, e.g., a sum of the weight of the PIPA particles and the carrier polyol. In other words, solids content refers to the weight of the PIPA particles as a percentage of the total weight of the dispersion. The weight of the PIPA particles may be a calculated weight determined according to methods known in the art, for instance.

The PIPA particles may have an average particle diameter from 0.1 to 10.0 microns. All individual values and subranges from 0.1 to 10.0 microns are included; for example, the PIPA particles may have an average particle diameter from a lower range of 0.1, 0.2, 0.3, 0.4, 0.5, 0.8, 1.0, or 1.5 microns to an upper range of 10.0, 9.0, 8.0, 7.0, 6.0, 5.0, 4.5, 4.0 or 3.5. One or more embodiments of the present disclosure provide that at least 90 wt % of the PIPA particles may have an average particle diameter from 0.1 to 5.0 microns; for example, 90 wt %, 91 wt %, 92 wt %, 93 wt %, 94 wt %, 95 wt %, or even a greater weight percent of the PIPA particles may have an average particle diameter from 0.1 to 5.0 microns.

One or more embodiments of the present disclosure provide that the dispersion of PIPA particles in the carrier polyol can be formed as a reaction product of a low equivalent weight isocyanate-reactive hydrogen containing compound with a polyisocyanate. One or more embodiments of the present disclosure provide that the low equivalent weight isocyanate-reactive hydrogen containing compound is a polyol. One or more embodiments of the present disclosure provide that the low equivalent weight isocyanate-reactive hydrogen containing compound has a number average isocyanate-reactive hydrogen equivalent weight of up to 80 g/mol. For instance, the low equivalent weight isocyanate-reactive hydrogen containing compound can have a number average isocyanate-reactive hydrogen equivalent weight from 50 to 80 g/mole. One or more embodiments of the present disclosure provide that the low equivalent weight isocyanate-reactive hydrogen containing compound has a number average isocyanate-reactive hydrogen equivalent weight of less than 80. Number average hydroxyl equivalent weight can be calculated as a quotient of molecular weight and average functionality, i.e., molecular weight divided by average functionality. This average functionality can be calculated as a quotient of total moles of isocyanate-reactive hydrogen and total moles of polyol. One or more embodiments of the present disclosure provide that the low equivalent weight isocyanate-reactive hydrogen containing compound may include 2 to 6 isocyanate-reactive hydrogen, e.g., hydroxyl groups and/or amines, groups per molecule. One or more embodiments of the present disclosure provide that the low equivalent weight isocyanate-reactive hydrogen containing compound may include 2 to 6 amine groups per molecule.

In forming the dispersion of PIPA particles in the carrier polyol, the low equivalent weight isocyanate-reactive hydrogen containing compound may be dispersed in the carrier polyol, e.g., in the form of small droplets. An amount of the low equivalent weight isocyanate-reactive hydrogen containing compound utilized may be sufficient to consume the isocyanate groups provided in the reaction mixture. For example, the polyisocyanate index for forming the dispersion of PIPA particles in the carrier polyol may be from 30 to 200 for equivalents of the hydroxyl groups of the low equivalent weight isocyanate-reactive hydrogen containing compound per equivalent of isocyanate groups. All individual values and subranges from 30 to 200 are included; for example, the polyisocyanate index for forming the dispersion of PIPA particles in the carrier polyol may be from a lower limit of 30, 40, 50, or 60 to an upper limit of 200, 175, 150, 120, 110, or 105 for equivalents of the hydroxyl groups of the low equivalent weight isocyanate-reactive hydrogen containing compound per equivalent of isocyanate groups. The polyisocyanate index can be determined as the equivalents of isocyanate in the reaction mixture for forming the dispersion of PIPA particles in the carrier polyol, divided by the total equivalents of isocyanate-reactive hydrogens in the reaction mixture, multiplied by 100. In other words, the polyisocyanate index is the ratio of isocyanate-groups over isocyanate-reactive hydrogen atoms present in the reaction mixture, given as a percentage.

In forming the dispersion of PIPA particles in the carrier polyol, the low equivalent weight isocyanate-reactive hydrogen containing compound may be used in an amount from 1 part to 50 parts, e.g., 2 parts to 30 parts, or 2 parts to 25 parts, etc., by weight per 100 parts by weight of the carrier polyol. All individual values and subranges from 1 part to 50 parts are included; for example, the low equivalent weight isocyanate-reactive hydrogen containing compound may be used in an amount from a low limit of 1, 2, 3, or 4 parts to an upper limit of 50, 40, 30, 20, 15, 10, or 7 parts by weight per 100 parts by weight of the carrier polyol.

Examples of the low equivalent weight isocyanate-reactive hydrogen containing compound include, but are not limited to, ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, sucrose, olamines, such as triethanolamine and diethanolamine, and combinations thereof.

As mentioned, the dispersion of PIPA particles in the carrier polyol can be formed as a reaction product of a low equivalent weight isocyanate-reactive hydrogen containing compound with a polyisocyanate. One or more embodiments of the present disclosure provide that the polyisocyanate has a number average isocyanate equivalent weight from 50 g/mole to 225 g/mole. All individual values and subranges from 50 to 225 g/mole are included; for example, the polyisocyanate can have a number average isocyanate equivalent weight from a lower limit of 50, 55, 60, 65, or 70 g/mole to an upper limit of 225, 200, 175, or 150 g/mole. The polyisocyanate may be an aromatic, a cycloaliphatic, or an aliphatic polyisocyanate. Examples of the polyisocyanate include, but are not limited to, m-phenylene diisocyanate (MDI), toluene diisocyanate (TDI), hexamethylene diisocyanate (HDI), tetramethylene diisocyanate, cyclohexane diisocyanate, hexahydrotoluene diisocyanate, naphthylene diisocyanate, bis(isocyanatomethyl)cyclohexane, and combinations thereof. One or more embodiments of the present disclosure provide that the polyisocyanate includes TDI and/or MDI, e.g., available from The Dow Chemical Company under the tradenames VORANATE and ISONATE. As an example, the polyisocyanate may include a mixture of different isomers of TDI or MDI, such as a mixture including from 60% to 85% of the 2,4'-isomer of TDI and 15% to 40% of the 2,6'isomer of TDI.

The dispersion of PIPA particles includes the carrier polyol. The carrier polyol can be a polyether, a polyester, a polycarbonate, a polymer of butadiene, an acrylate polyol, or combinations thereof, among others. For instance, the carrier polyol can include one or more of the polyester polyols discussed herein, among others. One or more embodiments of the present disclosure provides that the carrier polyol is a polyether polyol. For example, the carrier polyol may be a polyether polyol, e.g., a propylene oxide homopolymer or a copolymer of propylene oxide and ethylene oxide "Polyether" refers to a compound, e.g., a polyol, comprising two or more ether linkages. The carrier polyol can have an average molecular weight of 600 to 12000. All individual values and subranges 600 to 12000 are included; for example, the carrier polyol can have an average molecular weight from a lower limit of 600, 700, 800, 900, or 1000 to an upper limit of 12000, 11000, 10000, 9000, 8000, 7000, 6000, 5000, 4500, or 4000. The carrier polyol has a hydroxyl number from 25 mg KOH/g to 350 mg KOH/g. All individual values and subranges from 25 mg KOH/g to 350 mg KOH/g are included; for example, the carrier polyol can have a hydroxyl number from a lower limit of 25, 30, or 35 mg KOH/g to an upper limit of 350, 300, 250, 200, or 150 mg KOH/g. The carrier polyol can have a number average hydroxyl equivalent weight from 200 g/mole to 2000 g/mole. All individual values and subranges from 200 to 2000 g/mole are included; for example, the carrier polyol can have a number average hydroxyl equivalent weight from a lower limit of 200, 250, 400, or 800 200 g/mole to an upper limit of 2000, 1900, 1800, 1700, 1600, 1500, 1400, 1300, or 1250 g/mole.

One or more embodiments of the present disclosure provide that the carrier polyol includes from 50% to 100% secondary hydroxyls, based on a total number of hydroxyls of the carrier polyol. All individual values and subranges from 50% to 100% are included; for example, the carrier polyol can include secondary hydroxyls from a lower limit of 50%, 55%, 60%, or 96% to an upper limit of 100%, 99%, or 98% based on the total number of hydroxyls of the carrier polyol. Non-secondary hydroxyls of the carrier polyol may be primary hydroxyls. Selection of a catalyst for forming the carrier polyol may have an effect on the percentage of secondary and/or primary hydroxyl groups present in the resultant carrier polyol. For example, propylene oxide based homopolymers made with alkali metal catalysts may include less than 2% primary hydroxyl groups, whereas propylene oxide based homopolymers made using double metal cyanide catalyst complexes may have up to approximately 8% primary hydroxyl groups, based on the total amount of hydroxyl groups in the homopolymer of propylene oxide. One or more embodiments of the present disclosure provide that the carrier polyol is triol that is a polyoxypropylene homopolymer having a number average hydroxyl equivalent weight of 900 g/mole to 1350 g/mole and having 95% to 100% of secondary hydroxyl groups, based on a total number of hydroxyls of the carrier polyol.

The carrier polyol can have a nominal hydroxyl functionality from 2.0 to 6.0. All individual values and subranges from 2.0 to 6.0 are included; for example, the carrier polyol can a nominal hydroxyl functionally from a lower limit of 2.0, 2.2, 2.5, 2.7, or 2.9 to an upper limit of 6.0, 5.5, 5.0, or 4.2.

The carrier polyol may be a polyether polyol that is a homopolymer or copolymer that includes propylene oxide. For example, the carrier polyol may be a polymer of propylene oxide. Examples of copolymers include, but are not limited to, random copolymers of propylene oxide and ethylene oxide that are prepared by polymerizing a mixture of propylene oxide and ethylene oxide, e.g., to form polyoxypropylene-polyoxy ethylene copolymers having a polyoxy ethylene content from 0.5 wt % to 30 wt % based on a total weight of the copolymer. All individual values and subranges from 0.5 wt % to 30 wt % are included; for example, the polyoxypropylene-polyoxy ethylene copolymers can have a polyoxy ethylene content from a lower limit of 0.5, 1.0, 2.0, or 5.0 wt % to an upper limit of 30, 28, 25, 20, or 15 wt % based on a total weight of the copolymer. One or more embodiments of the present disclosure provide that the copolymer includes block copolymers containing one or more internal blocks of polymerized of one of propylene oxide and ethylene oxide and terminal blocks of the other of propylene oxide and ethylene oxide. The terminal block may be from 0.5 wt % to 30 wt %, based on a total weight of the copolymer. All individual values and subranges from 0.5 wt % to 30 wt % are included; for example, the terminal block may be from a lower limit of 0.5, 1.0, 2.0, or 5.0 wt % to an upper limit of 30, 28, 25, 20, or 15 wt % based on a total weight of the copolymer. One or more embodiments of the present disclosure provide that the carrier polyol is a triol that is a copolymer, e.g., a random copolymer or a block copolymer, having from 80 wt % to 99.5 wt % of polyoxypropylene and 0.5 wt % to 20 wt % of polyoxyethylene, based on a total weight of the copolymer, and having a number average hydroxyl equivalent weight of 900 g/mole to 1350 g/mole and having 95% to 100% secondary hydroxyl groups, based on to total number of hydroxyls of the copolymer.

The carrier polyol may be prepared by polymerizing propylene oxide, ethylene oxide, and/or butylene oxide in the presence of one or more initiators. The initiator may include at least two oxyalkylatable hydrogen atoms. Hydroxyl groups, primary amine groups, secondary amine groups, and thiol groups are examples of groups that contain oxyalkylatable hydrogen atoms. Examples of initiators include, but are not limited to glycerin, water, ethylene glycol, propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, propane diamine, and combinations thereof.

One more additional components may be utilized in forming the dispersion of PIPA particles in the carrier polyol. Such additional components may be discussed in WO2015/038825 and WO2015/038826, for example. One or more embodiments of the present disclosure provide that the one more additional components include a stabilizer and/or water.

As an example, forming the dispersion of PIPA particles in the carrier polyol may be performed in a batch process, in a semi-batch process, a continuous process, or a combination thereof. The carrier polyol, the polyisocyanate, the low equivalent weight isocyanate-reactive hydrogen containing compound, may be added in any order to a reaction mixture. For example, to form the dispersion of PIPA particles in the carrier polyol, the reaction of the low equivalent weight isocyanate-reactive hydrogen containing compound with the polyisocyanate may occur in the presence of the carrier polyol, or a pre-reaction between the carrier polyol and the polyisocyanate may be performed and the low equivalent weight isocyanate-reactive hydrogen containing compound may be added to the thereafter. For instance, when forming a pre-reaction mixture, the process may include combining 1 part to 50 parts by weight of the polyisocyanate having an average isocyanate equivalent weight that is less than 225 and 100 parts by weight of the carrier polyol having a number average hydroxyl equivalent weight of at least 200 g/mole and at least 80% of secondary hydroxyl groups. The polyisocyanate can react with the polyether polyol while mixing to produce a pre-reaction mixture containing unreacted carrier polyol, unreacted polyisocyanate, and one or more isocyanate group-containing adducts of the carrier polyol with the polyisocyanate. Then, the low equivalent weight isocyanate-reactive hydrogen containing compound having a number average isocyanate-reactive hydrogen containing equivalent weight of less than 80 g/mole and optionally additional polyisocyanate can be dispensed into the pre-reaction mixture, e.g., such that the low equivalent weight isocyanate-reactive hydrogen containing compound may be provided to consume the isocyanate groups in the pre-reaction mixture. For example, 1 to 30 parts of the low equivalent weight isocyanate-reactive hydrogen containing compound can be added. The low equivalent weight isocyanate-reactive hydrogen containing compound can react with the isocyanate groups to form PIPA particles dispersed in the carrier polyol. The pre-reaction may be formed by continuously bringing the liquid carrier polyol and the polyisocyanate together in a mixhead to form a mixture that is continuously introduced into a tubular reactor, and the low equivalent weight isocyanate-reactive hydrogen containing compound and the optional additional polyisocyanate may be added downstream of the tubular reactor.

The dispersion of PIPA particles in the carrier polyol forming reaction may be performed at a reaction temperature from 15° C. to 150° C. All individual values and subranges from 15° C. to 150° C. are included for example, the reaction temperature can be from a lower limit of 15° C. or 20° C. to an upper limit of 150° C. or 130° C. Cooling may be utilized to maintain the reaction temperature.

The polyol compositions disclosed herein include a polyester polyol that is from 1 wt % to 98 wt % of the polyol composition based upon a total weight of the polyol composition. All individual values and subranges from 1 wt % to 98 wt % of the polyol composition are included for example, the polyester polyol can be from a lower limit of 1, 3, 5, 10, 15, 20, 25, 30, 32, 35, or 40 wt % to an upper limit of 98, 95, 90, 85, 80, 75, 70, 68, 65, 60, 55, 50, or 45 wt % of the polyol composition based upon the total weight of the polyol composition. One or more embodiments of the present disclosure provide that the polyester polyol is selected from a first polyester polyol, a second polyester polyol, and a combination of the first polyester polyol and the second polyester polyol. For instance, the first polyester polyol may be from 1 wt % to 98 wt % of the polyol composition based upon the total weight of the polyol composition; the second polyester polyol may be from 1 wt % to 98 wt % of the polyol composition based upon the total weight of the polyol composition; or a combination of the first polyester polyol and the second polyester polyol may be from 1 wt % to 98 wt % of the polyol composition based upon the total weight of the polyol composition "Polyester" refers to a compound, e.g., a polyol, comprising two or more ester linkages. The polyester polyols described herein, e.g., the first polyester polyol and/or the second polyester polyol, may contain a long-chain aliphatic group as part of one or more of repeating constitutional units. In one or more embodiments, the constitutional units containing the long-chain aliphatic group may be derived from a dibasic acid, or an ester thereof. In one or more embodiments, the polyester polyol may contain other constitutional units, for example, constitutional units derived from one or more diols, which may react with the dibasic acids/esters to form a polyester polyol.

The polyester polyols can be formed by a number of processes. For instance, a polyester polyol can be formed from a reaction mixture that includes, among other things, diols, such as short-chain diols, dibasic acids and/or esters thereof, triols such as glycerol or trimethylpropane, and/or tetrols such as quadrol. Polyester polyols can be formed by condensation reactions. Examples of acids and/or esters include, but are not limited to 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecane-dioic acid, 1,18-octadecanedioic acid, 1,19-nonadecanedioic acid, 1,20-icosanedioic acid, 1,21-henicosanedioic acid, 1,22-docosanedioic acid, 1,23-tricosanedioic acid, 1,24-tetracosanedioic acid, or any esters thereof, or combinations thereof. "Short-chain diol" refers to a diol having from 1 to 18 carbon atoms. In one or more embodiments, the short-chain diol is a C.sub.2-18 hydrocarbylene diol, where one or more saturated carbon atoms of the hydrocarbylene group are optionally replaced by oxygen, nitrogen, sulfur, or silicon. In some other embodiments, the short-chain diol is ethylene glycol, diethylene glycol, triethylene glycol, tetraethylene glycol, pentaethylene glycol, propylene glycol, dipropylene glycol, tripropylene glycol, tetrapropylene glycol, 1,3-propanediol, 1,3-butanediol, 1,4-butanediol, neopentyl glycol, 1,5-pentanediol, 1,6-hexanediol, 1,4-cyclohexane-dimethanol, hydroquinone bis(2-hydroxyethyl) ether, or p-di-(2-hydroxyethoxyl)benzene, or combinations thereof.

The polyester polyols can include blocks, e.g., as with block copolymers. Examples of the blocks include, but are not limited to, acrylic polymers, polyamides, polycarbamates, polyureas, polyanhydrides, substituted polyvinyl polymers, polycarbonates, or any copolymers thereof.

The first polyester polyol can have an average functionality from 2.0 to 2.8. All individual values and subranges from 2.0 to 2.8 are included; for example, the first polyester polyol can have an average functionality from a lower limit of 2.0 or 2.1 to an upper limit of 2.8 or 2.7. This average functionality can be calculated as a quotient of total moles of OH and total moles of polyol. The first polyester polyol can have a hydroxyl number from 215 mg KOH/g to 255 mg KOH/g. All individual values and subranges from 215 to 255 mg KOH/g are included; for example, the first polyester polyol can have a hydroxyl number from a lower limit of 215, 220, or 225 mg KOH/g to an upper limit of 255, 250, or mg 245 KOH/g.

The second polyester polyol can have an average functionality from 2.4 to 3.5. All individual values and subranges from 2.4 to 3.5 are included; for example, the second polyester polyol can have an average functionality from a lower limit of 2.4 or 2.7 to an upper limit of 3.5 or 3.3. The second polyester polyol can have a hydroxyl number from 295 mg KOH/g to 335 mg KOH/g. All individual values and subranges from 295 to 335 mg KOH/g are included; for example, the second polyester polyol can have a hydroxyl number from a lower limit of 295, 300, or 305 mg KOH/g to an upper limit of 335, 330, or 325 mg KOH/g.

The polyol compositions disclosed herein may include a surfactant. Examples of surfactants include silicon-based compounds such as silicone oils and organosilicone-polyether copolymers, such as polydimethyl siloxane and polydimethylsiloxane-polyoxyalkylene block copolymers, e.g., polyether modified polydimethyl siloxane, and combinations thereof. Examples of surfactants include silica particles and silica aerogel powders, as well as organic surfactants such as nonylphenol ethoxylates. Surfactants are available commercially and include those available under trade names such as NIAX™, DABCO™, and TEGOSTAB™, among others. Some embodiments of the present disclosure provide that surfactant, when utilized, is from 0.1 parts to 3.0 parts per 100 parts of total polyol of the polyol composition. All individual values and subranges from 0.1 parts to 3.0 parts are included; for example, the surfactant can be from a lower limit of 0.1, 0.2, or 0.3 parts to an upper limit of 3.0, 2.5, or 2.0 per 100 parts of total polyol of the polyol compositions.

The polyol compositions disclosed herein may include a catalyst. The catalyst can be an amine catalyst, a metallic catalyst, and combinations thereof. Examples of amine catalysts include, but are not limited to, pentamethyldiethylene-triamine, triethylamine, tributyl amine, dimethylethanolamine, N,N,N',N'-tetra-methylethylenediamine, dimethylbenzylamine, N,N,N',N'-tetramethylbutanediamine, dimethylcyclohexylamine, triethylenediamine, and combinations thereof, among others. Examples of metallic catalysts include tin(II) salts of organic carboxylic acids, e.g., tin(II) diacetate, tin(II) dioctanoate, tin(II) diethylhexanoate, stannous octoate, and tin(II) dilaurate, and dialkyltin(IV) salts of organic carboxylic acids, e.g., dibutyltin diacetate, dibutyltin dilaurate, dibutyltin maleate and dioctyltin diacetate, and combinations thereof, among others. Catalysts are available commercially and include those available under trade names such as NIAX™, POLYCAT™, and DABCO™, among others. One or more embodiments of the present disclosure provide that the catalyst can be a combination of at least one amine and a metal salt.

Embodiments of the present disclosure provide that the catalyst can be from 0.04 parts to 8.00 parts per 100 parts of total polyol of the polyol compositions. All individual values and subranges from 0.04 parts to 8.00 parts are included; for example, the catalyst can be from a lower limit of 0.04, 0.07, or 0.09 parts to an upper limit of 8.00, 7.50, or 7.00 parts per 100 parts of total polyol of the polyol compositions.

The polyol compositions disclosed herein may include a flame retardant. A number of flame retardants are known to those skilled in the art. An example of the flame retardant is tris(2-chloroisopropyl)-phosphate. The flame retardant, when utilized, can be from 4.0 parts to 15.0 parts per 100 parts of total polyol of the polyol compositions. All individual values and subranges from 4.0 parts to 15.0 parts are included; for example, the flame retardant can be from a lower limit of 4.0, 4.5, or 5.0 parts to an upper limit of 15.0, 14.5, or 14.0 parts per 100 parts of total polyol of the polyol compositions.

The polyol compositions disclosed herein may one or more additional components. Different additional components and/or different amounts of the additional components may be utilized for various applications. Examples of additional components include liquid and/or solid pigments, colorants, crosslinkers, fillers, chain extenders, antioxidants, surface modifiers, bioretardant agents, mold release agents, and combinations thereof, among others.

One or more embodiments of the present disclosure provide a rigid closed-cell foam formulation. The rigid closed-cell foam formulation may include the polyol composition disclosed herein, a blowing agent, and a polyisocyanate.

The rigid closed-cell foam formulation can include from 5 wt % to 85 wt % of the polyol composition, based upon a total weight of the rigid closed-cell foam formulation. All individual values and subranges from 5 wt % to 85 wt % are included; for example, the rigid closed-cell foam formulation can include from a lower limit of 5 wt %, 8 wt %, 10 wt %, 15 wt %, or 20 wt % to an upper limit of 85 wt %, 80 wt %, 75 wt %, 70 wt %, or 65 wt % of the polyol composition, based upon a total weight of the rigid closed-cell foam formulation.

As mentioned, the rigid closed-cell foam formulation can include blowing agent. The blowing agent can be a physical blowing agent, a chemical blowing agent, or combinations thereof.

Physical blowing agents may help to foam the rigid closed-cell foam formulations. Examples of physical blowing agents include liquid carbon dioxide; alkanes; cycloalkanes, such as, cyclopentane, cyclohexane, cyclobutane and mixtures thereof other cycloalkanes having up to 7 carbon atoms; dialkyl ethers, cycloalkylene ethers, fluoroalkanes, and mixtures thereof. Examples of alkanes include, but are not limited to, propane, butane, n-butane, isobutane, pentane, isopentane and combinations thereof. Examples of dialkyl ethers include dimethyl ether, methyl ethyl ether, methyl butyl ether, diethyl ether, and combinations thereof. An example of a cycloalkylene ether is furan. Examples of fluoroalkanes include, but are not limited to, trifluoromethane, difluoromethane, difluoroethane, tetrafluoroethane, hepta-fluoropropane, and combinations thereof.

Some embodiments of the present disclosure provide that the physical blowing agent, when utilized, can be from 0.5 parts to 22.0 parts per 100 parts of total polyol in the rigid closed-cell foam formulation. All individual values and subranges from 0.5 parts to 22.0 parts are included; for example, the physical blowing agent can be from a lower limit of 0.5, 1.0, or 2.0 parts to an upper limit of 22.0, 20.0, 17.0, 15.0, 13.0, or 10.0 parts per 100 parts of total polyol in the rigid closed-cell foam formulation.

Chemical blowing agents can be utilized to form carbon dioxide from a reaction with the polyisocyanate, for instance. An example the chemical blowing agent is water. Some embodiments of the present disclosure provide that the chemical blowing agent, when utilized, is from 0.2 parts to 5.0 parts per 100 parts of total polyol in the rigid closed-cell foam formulation. All individual values and subranges from 0.2 parts to 5.0 parts are included; for example, the chemical blowing agent can be from a lower limit of 0.2, 0.3, or 0.4 parts to an upper limit of 5.0, 4.8, or 4.6 parts per 100 parts of total polyol in the rigid closed-cell foam formulation. Some embodiments of the present disclosure provide that carbon dioxide may also be utilized via adducts of carbon dioxide, such as carbamates, which may be added to the rigid closed-cell foam formulations.

The rigid closed-cell foam formulation can include a polyisocyanate. Polyisocyanates that may be utilized for the rigid closed-cell foam formulation are those previous discussed herein, i.e., the polyisocyanates discussed with the dispersion of PIPA particles in the carrier polyol. The rigid closed-cell foam formulation may have a polyisocyanate index from 150 to 500. All individual values and subranges from 150 to 500 are included; for example, the rigid closed-cell foam formulation may have a polyisocyanate index from a lower limit of 150, 175, or 200 to an upper limit of 500, 425, or 350. The polyisocyanate index can be determined as the equivalents of isocyanate in the rigid closed-cell foam formulation, divided by the total equivalents of isocyanate-reactive hydrogens in the rigid closed-cell foam formulation, multiplied by 100.

The rigid closed-cell foam disclosed herein can be prepared by curing, e.g. reacting, the rigid closed-cell foam formulations previously discussed. As mentioned, the rigid closed-cell foam formulations disclosed herein can have a number of curing properties that are desirable for various applications.

The rigid closed-cell foam formulation can have a cream time from 3 seconds to 30 seconds. All individual values and subranges from 3 to 30 are included; for example, the rigid closed-cell foam formulation may have a cream time from a lower limit of 3, 4, or 5 seconds to an upper limit of 30, 29, or 28 seconds.

The rigid closed-cell foam formulation can have a gel time from 10 seconds to 140 seconds. All individual values and subranges from 10 to 140 are included; for example, the rigid closed-cell foam formulation may have a gel time from a lower limit of 10, 15, or 20 seconds to an upper limit of 140, 120, or 100 seconds.

The rigid closed-cell foam formulation can have a tack free time from 20 seconds to 180 seconds. All individual values and subranges from 20 to 180 are included; for example, the rigid closed-cell foam formulation may have a tack free time from a lower limit of 20, 25, or 30 seconds to an upper limit of 180, 170, 160, 150, 140, 130, 120, 110, 100, 90, 80, 70, 60, 55, or 50 seconds.

The rigid closed-cell foams disclosed herein can be prepared using known methods. These methods may include continuous or discontinuous free-rise slabstock foam processes and molded foam processes using a mixing head or a stirrer to blend components together with or without addition of air, for example. Output of the mixing head can be deposited onto a conveyor or to a mold. For a slabstock process, the rigid closed-cell foam can expand further and rises as it moves down the conveyor, forming a continuous rigid closed-cell foam slab that can be cut into blocks or buns of a desired length for further curing and/or storage and subsequent slicing. In a discontinuous process, the rigid closed-cell foam formulation can be mixed through a head and poured into a container. A variable pressure foaming (VPF) process, as described in U.S. Pat. No. 5,194,453, can be utilized.

A molded foam process can utilize a one-shot approach in which a specific amount of the polyisocyanate is combined and mixed with a specific amount of a remaining rigid closed-cell foam formulation components to form a mixture. The mixture can be deposited as a froth into a mold that is then closed. The foam can expand to fill the mold, which is subsequently opened for demolding after a curing time. The curing time can be between 1 and 20 minutes, for example. Various curing temperatures may be utilized for various applications.

As mentioned, the rigid closed-cell foams can have an improved, i.e., reduced, average cell diameter as compared to other rigid closed-cell foams. The rigid closed-cell foams can have an average cell diameter from 90 microns to 165 microns. All individual values and subranges from 90 to 165 microns are included; for example, the rigid closed-cell foam can have an average cell diameter from a lower limit of 90, 100, 110, or 120 microns to an upper limit 165, 160, or 155 microns.

The rigid closed-cell foam can have a thermal conductivity at 10° C. average plate temperature from 17 to 24 milliwatts per meter kelvin. All individual values and subranges from 17 to 24 milliwatts per meter kelvin are included; for example, the rigid closed-cell foam can have a thermal conductivity at 10° C. average plate temperature from a lower limit of 17, 19, 20.5, or 21 milliwatts per meter kelvin to an upper limit of 24, 23.5, or 23 milliwatts per meter kelvin.

The rigid closed-cell foam can have a thermal conductivity at 24° C. average plate temperature from 18 to 25 milliwatts per meter kelvin. All individual values and subranges from 18 to 25 milliwatts per meter kelvin are included; for example, the rigid closed-cell foam can have a thermal conductivity at 24° C. average plate temperature from a lower limit of 18, 19, 21.5, or 22 milliwatts per meter kelvin to an upper limit of 25, 25.5, or 24 milliwatts per meter kelvin.

The rigid closed-cell foam can have an open cell volume percentage from 1 volume percent to 15 volume percent. All individual values and subranges from 1 to 15 volume percent are included; for example, the rigid closed-cell foam can have an open cell volume percentage from a lower limit of 1, 2, 3, 4, 5, 6, or 7 volume percent to an upper limit of 15, 14, or 13 volume percent.

The rigid closed-cell foam can have a free rise density from 21 kg/m$^3$ to 50 kg/m$^3$. All individual values and subranges from 21 kg/m$^3$ to 50 kg/m$^3$ are included; for example, the rigid closed-cell foams can have a free rise density from a lower limit of 21 kg/m$^3$, 23 kg/m$^3$, 25 kg/m$^3$, 27 kg/m$^3$, or 30 kg/m$^3$ to an upper limit of 50 kg/m$^3$, 45 kg/m$^3$, or 40 kg/m$^3$.

Examples

In the Examples, various terms and designations for materials are used including, for instance, the following:

Polyol A (polyester polyol, formed from phthalic anhydride, diethylene glycol, and long chain fatty acid; average functionality 2.0; hydroxyl number 235 mg KOH/g); Polyol B (polyester polyol, formed from terephthalic acid, diethylene glycol, polyethylene glycol, and glycerol; average functionality 2.4; hydroxyl number 315 mg KOH/g); Polyol C (dispersion of polyisocyanate polyaddition particles in a carrier polyol having solids content of approximately 20%. Ninety weight percent of the polyisocyanate polyaddition particles had an average particle diameter of less than 5 microns, measured with a Beckman Coulter LS Particle Size Analyzer. The carrier polyol had a nominal hydroxyl functionality of 3. The carrier polyol had a hydroxyl number of 56 KOH/g. The carrier polyol was a 3000 molecular weight, nominally trifunctional poly(propylene oxide) having at least 90% secondary hydroxyl groups. The polyisocyanate polyaddition particles were the reaction product of triethanolamine and an 80/20 mixture of the 2,4- and 2,6-isomers of toluene diisocyanate. Polyol C was prepared as described in WO2015/038825 and WO2015/038826); Polyol D (polyether polyol; glycerin initiated polyol/polypropylene oxide, hydroxyl number 55 mg KOH/g, nominal hydroxyl functionally 3.0); NIAX™ L-6633 (polyether-modified polysiloxane; surfactant; available from MOMENTIVE™); DABCO™ K 2097 (potassium acetate in diethylene glycol; catalyst; available from Air Products); POLYCAT™ 5 (PM- DETA-N,N,N',N",N"-pentamethyldiethylenetriamine; catalyst; available from Air Products); VORACOR™ CM822 (potassium 2-ethyl hexanoate in diethylene glycol and triethyl phosphate); available from The Dow Chemical Company); tris(2-chloroisopropyl)-phosphate (flame retardant; available from ICL); VORANATE™ M 600 (polymeric methylene diphenyl diisocyanate, NCO 30.5%; available from The Dow Chemical Company).

Example 1, a polyol composition, was formed as follows. Polyol A (64.77 parts), Polyol B (21.37 parts), and Polyol C (the dispersion of polyisocyanate polyaddition particles in the carrier polyol (10.00 parts)) were combined in a container to provide Example 1. NIAX™ L-6633 (1.97 parts), DABCO™ K 2097 (0.44 parts), POLYCAT™ 5 (0.27 parts), VORACOR™ CM822 (2.81 parts), tris(2-chloroisopropyl)-phosphate (10.72 parts), and water (0.44 parts) were added to Example 1. Example 1 included 64.77 wt % of Polyol A and 21.37 wt % of Polyol B based upon a total weight of Example 1.

Example 2, a rigid foam formulation, was formed as follows. Example 1 was combined with VORANATE™ M 600 (167.5 parts). The composition of Example 2 is reported in Table 1. For Example 2, all components except the VORANATE™ M 600 were combined in a first feed container of a high pressure injection machine (Cannon AP-40) and the VORANATE™ M 600 was placed in a second feed container of the high pressure injection machine. The high pressure injection machine was operated a temperature of 20° C.±2° C. and a mix pressure of 15,000 kPa±2000 kPa, while the polyisocyante index was maintained at 250 to produce Example 3, a rigid foam.

Comparative Example A was formed as Example 2, with the change that a Polyol D was utilized rather than Polyol C. The composition of Comparative Example A is reported in Table 1. Comparative Example B, a rigid foam was formed as Example 3, with the change that Comparative Example A was utilized rather than Example 2.

TABLE 1

|  | Example 2 | Comparative Example A |
|---|---|---|
| Polyol A | 64.77 (parts) | 64.77 (parts) |
| Polyol B | 21.37 (parts) | 21.37 (parts) |
| Polyol C | 10.00 (parts) | — |
| Polyol D | — | 8.00 (parts) |
| DABCO ™ K 2097 | 0.44 (parts) | 0.44 (parts) |
| POLYCAT ™ 5 | 0.27 (parts) | 0.27 (parts) |
| NIAX ™ L-6633 | 1.97 (parts) | 1.97 (parts) |
| VORACOR ™ CM822 | 2.81 (parts) | 2.81 (parts) |
| Tris(2-chloroisopropyl)-phosphate | 10.72 (parts) | 10.72 (parts) |
| Water | 0.44 (parts) | 0.44 (parts) |
| VORANATE ™ M 600 | polyisocyanate index 250 | polyisocyanate index 250 |
| Cycloisopentane | 16.2 (parts) | 16.5 (parts) |

As mentioned, Example 3, a rigid closed-cell foam, was formed from Example 2 and Comparative Example B, a rigid closed-cell foam, was formed from Comparative Example A; additionally, Comparative Example C was formed as Comparative Example B with the change that POLYOL D was excluded. For Example 3 and Comparative Examples B-C average cell diameter was determined by Scanning Electron Microscope analysis: portions of Example 3 and Comparative Examples B-C were respectively mounted to a holder, dried, and sputtered with gold for 250 seconds at 20 µA with a Quorum Q150R-S gold sputter coater. The coated portions were analyzed with a Philips XL30 FEGSEM scanning electron microscope at an accelerating voltage of 20 kV and a secondary electron detector for imaging. The results are reported in Table 2.

TABLE 2

|  | Example 3 | Comparative Example B | Comparative Example C |
|---|---|---|---|
| Average cell diameter | 148.5 µm | 173.0 µm | 195.8 µm |

The data of Table 2 illustrates that Example 3 has an improved, i.e., smaller, average cell diameter, as compared to Comparative Examples B-C.

For Example 3 and Comparative Example B thermal conductivity was determined, according to ISO 12939/DIN 52612, with a LaserComp Fox 200 at average plate temperatures of 10° C. and 24° C. The results are reported in Table 3.

TABLE 3

|  | Example 3 | Comparative Example B |
|---|---|---|
| Thermal conductivity (24 hour, 10° C.) | 22.59 milliwatts per meter kelvin | 22.98 milliwatts per meter kelvin |
| Thermal conductivity (24 hour, 24° C.) | 23.41 milliwatts per meter kelvin | 23.77 milliwatts per meter kelvin |

The data of Table 3 illustrates that Example 3 has an improved thermal conductivity, as compared to Comparative Example B, for both the average temperature of 10° C. and the average temperature of 24° C.

Additionally, respective portions of Example 3 and Comparative Example B were cured as free rise box foams for which open cell volume percentages were determined according to ASTM D 6226. Cream time, gel time, and tack free time were determined by observation as follows. Cream time: time at which the liquid reacting mixture color became clearer due to bubble nucleation. Gel time: time at which the foam had developed enough strength to be dimensionally stable, and a tongue depressor started drawing strings when inserted and quickly removed from the foam. Tack free time: time at which the foam surface (skin) lost its stickiness when gently touched. Free rise density was determined on a 25 cm high foam sample prepared in a wooden box (size 30×20×25 cm). The sample was cut 20 min after foaming to obtain a core foam sample, and its density was measured as kg/m³. The results are reported in Table 4.

TABLE 4

|  | Example 3 | Comparative Example B |
|---|---|---|
| Open cell volume percent | 11 volume percent | 12 volume percent |
| Cream time | 11 seconds | 11 seconds |
| Gel time | 25 seconds | 25 seconds |
| Tack free time | 34 seconds | 33 seconds |
| Free rise density | 33.5 kg/m³ | 33.5 kg/m³ |

The data of Table 3 illustrates that both Example 3 and Comparative Example B are both closed-cell foams. Further, Example 3 has an improved, i.e., reduced, open cell volume percent, as compared to Comparative Example B. This data indicates that the PIPA particles are not disrupting the cells, as in the case of SAN.

Additionally, the data of Table 4 illustrates that Example 3 and Comparative Example B have comparable cream times, gel times, and tack free times. This indicates that these curing properties are not adversely affected when utilizing the polyol compositions, which include a dispersion of polyisocyanate polyaddition particles in a carrier polyol as disclosed herein.

What is claimed:

1. A polyol composition comprising:
   a dispersion of polyisocyanate polyaddition particles in a carrier polyol, wherein the polyisocyanate polyaddition particles have an average particle diameter from 0.1 to 10.0 microns, and the dispersion has a solids content from 5 wt % to 50 wt % based upon a total weight of the dispersion; and
   a polyester polyol that is from 1 wt % to 98 wt % of the polyol composition based upon a total weight of the polyol composition, wherein the polyester polyol comprises a first polyester polyol having an average functionality from 2.0 to 2.8 and a hydroxyl number from 215 mg KOH/g to 255 mg KOH/g and a second polyester polyol having an average functionality from 2.4 to 3.5 and a hydroxyl number from 295 mg KOH/g to 335 mg KOH/g.

2. The polyol composition of claim 1, wherein the carrier polyol has a nominal hydroxyl functionality from 2.0 to 6.0.

3. The polyol composition of claim 1, wherein the carrier polyol has a hydroxyl number from 25 mg KOH/g to 350 mg KOH/g.

4. The polyol composition of claim 1, wherein the carrier polyol is a glycerin initiated polyol formed with propylene oxide.

5. The polyol composition of claim 1, wherein the polyol composition further comprises a surfactant.

6. The polyol composition of claim 1, wherein the polyol composition further comprises a catalyst.

7. The polyol composition of claim 1, wherein the polyol composition further comprises a flame retardant.

8. A rigid closed-cell foam formulation comprising:
   the polyol composition of claim 1;
   a blowing agent; and
   a polyisocyanate.

9. The rigid closed-cell foam formulation of claim 8, wherein the rigid foam formulation has a polyisocyante index from 150 to 500.

10. A rigid closed-cell foam formed from the rigid foam formulation of claim 8, wherein the rigid closed-cell foam has an average cell diameter from 90 microns to 165 microns.

11. The rigid closed-cell foam of claim 10, wherein the rigid closed-cell foam has a free rise density from 21 kg/m$^3$ to 50 kg/m$^3$.

12. A method for forming a rigid closed-cell foam comprising:
   curing the rigid closed-cell foam formulation of claim 8.

* * * * *